United States Patent [19]
Vawter et al.

[11] 3,764,786
[45] Oct. 9, 1973

[54] CUTTER DIAMETER COMPENSATION FOR NUMERICAL CONTROL MACHINE TOOLS

[75] Inventors: Verne E. Vawter, Bonita; William D. Wilson, San Diego, both of Calif.

[73] Assignee: Rohr Industries, Inc., Chula Vista, Calif.

[22] Filed: May 5, 1972

[21] Appl. No.: 250,696

[52] U.S. Cl............ 235/151.11, 318/572, 318/573
[51] Int. Cl. ........................................ G05b 19/24
[58] Field of Search................ 235/151.11; 318/570, 318/572, 573, 574, 596, 601

[56] References Cited
UNITED STATES PATENTS

| | | | |
|---|---|---|---|
| 3,679,955 | 7/1972 | Rhoades | 318/572 |
| 3,449,554 | 6/1969 | Kelling | 235/151.11 |
| 3,684,874 | 8/1972 | Kelling | 235/151.11 |
| 3,685,022 | 8/1972 | Raynes | 235/151.11 X |

*Primary Examiner*—Charles E. Atkinson
*Assistant Examiner*—Jerry Smith
*Attorney*—George E. Pearson

[57] ABSTRACT

Each time the rotary bit of a milling machine is sharpned, the diameter of the bit is reduced and the spindle carrying the bit must be shifted with respect to the workpiece. Where the path of the spindle is defined by a record or "program" of binary numbers on a punched tape or on a magnetic drum or disc, a different program must be composed for each bit size. This invention obviates all of the many programs and most of the computer memory storage. A program for the maximum and minimum cutter bit diamters, only, are composed and stored and the readout of these two values are combined in a fixed ratio n and applied to the controls of the machine tool.

7 Claims, 4 Drawing Figures

CUTTER DIAMETER COMPENSATION FOR NUMERICAL CONTROL MACHINE TOOLS

BACKGROUND OF THE INVENTION

Direct numerical control of machine tools has attained wide acceptance in heavy industry. Heretofore, a different number program was required for each change in diameter of the cutting bit when each time the bit was sharpened. There may be many sharpenings and there must, of course, be a corresponding number of programs. All of these innumerable programs must be stored in the relatively expensive storage facilities of modern computers.

The object of this invention is to eliminate the necessity of all programs more than two for each cutting bit for any given workpiece.

SUMMARY OF THE INVENTION

Two sets only of program numbers are generated and stored for one cutting bit, the programs containing the numbers required for the two extreme dimensions of the bit. A rotary tool will have a maximum diameter when it is new and a minimum diameter after its last sharpening. Simultaneously, the two programs are read out and like numerical portions of the two programs are combined to produce a single number which is a fixed ratio $n$, of the difference between the two dimensions. It is shown below that this ratio, $n$, can be selected to make all cutter bits of dimensions between the two limits track properly throughout the manufacture of a given workpiece.

Other objects and features of this invention will become apparent to those skilled in the art by referring to the following specification of preferred embodiments and referring to the accompanying drawings in which.

DETAILED DESCRIPTION OF ONE EMBODIMENT

Figure 1:
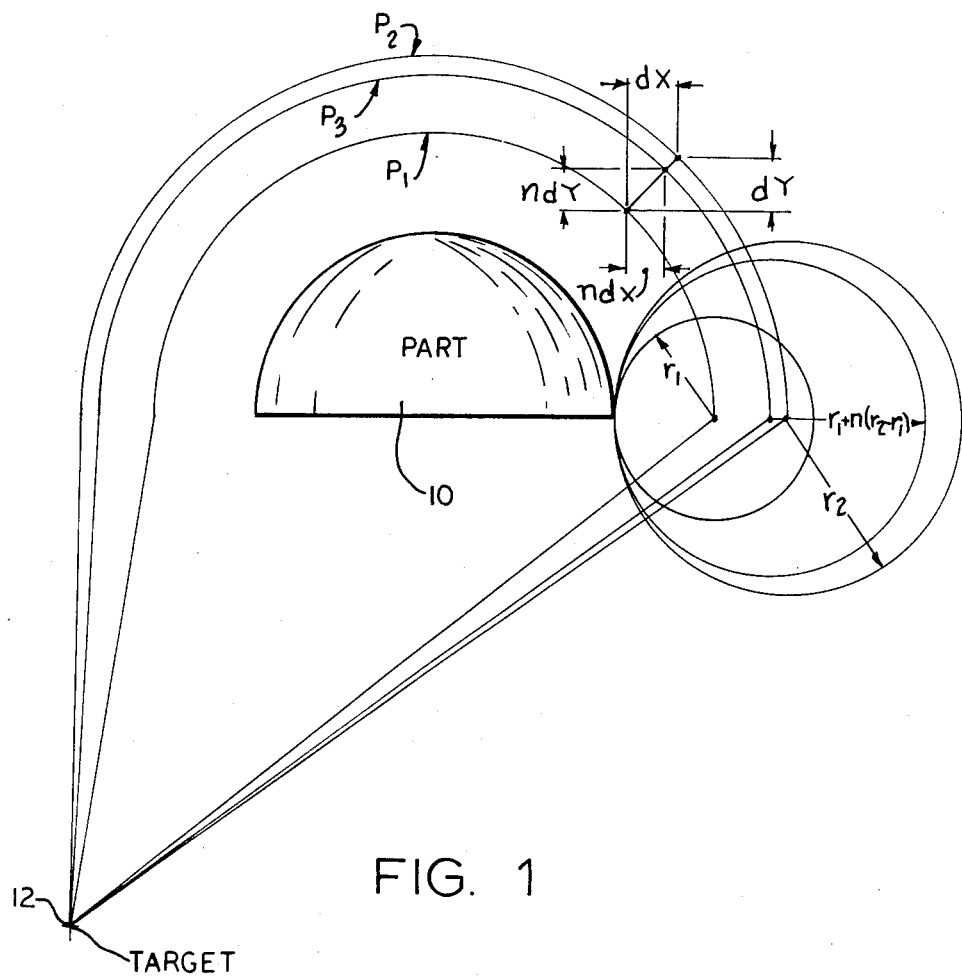
FIG. 1 is a diagram of the geometric problem involved in machining a workpiece with bits of different diameters.

In FIG. 1, part 10 represents a workpiece to be machined by a circular cutter traveling in path P. At 12 is the arbitrary reference starting point for the coordinates of the number program and machining operation. Let it be assumed that the cutting tool is circular and that its maximum radius is $r_2$. This would be the diameter of the tool when it was new. As the tool is sharpened and its diameter is reduced to $r_1$, we can then have two paths, $P_1$ and $P_2$, respectively, for the center of the new tool and the fully worn tool.

According to this invention, two programs are composed for defining the two paths, $P_1$ and $P_2$, one for the minimum diameter and one for the maximum diameter of the cutter that would be used in making workpiece 10. Novel means are provided to simultaneously execute these programs, generating signals corresponding to the two paths of the two cutters. The two signals are combined in the proportion, $n_1$. The ratio $n$ is determined by the two cutter diameters used. That is, if paths $P_1$ and $P_2$ are for cutters of radius $r_1$ and $r_2$ it can be shown the intermediate path $P_3$ will be correct if the intermediate radius is $r_1 + n(r_2 - r_1)$.

Figure 2:
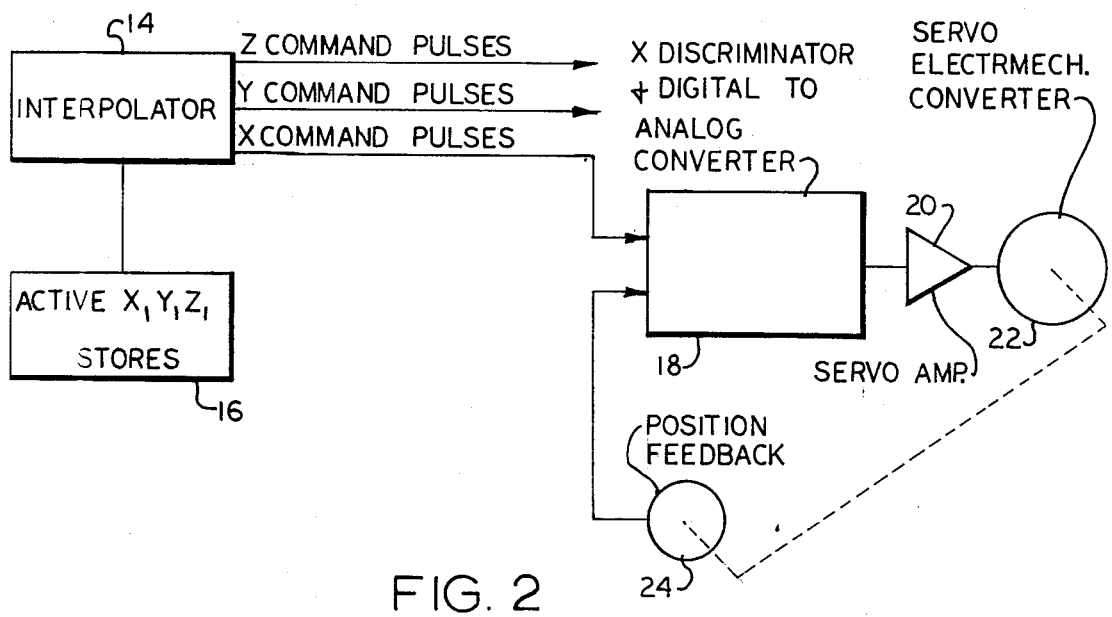
FIG. 2 is a block diagram of the essential subassemblies of a computer controlled machine tool.

Referring first to FIG. 2, the interpolator 14 receives the information from storage device 16 corresponding to movement of the tool along the X, Y, and Z axis. Discriminator 18 receives, say, the X axis information which is digital numerical information and converts that information to analog values which is then amplified at 20 and applied to the motor 22 for moving the cutter along same path in the X direction. Feedback 24 positively informs the discriminator 18 for keeping the cutter on its described path.

Figure 3:
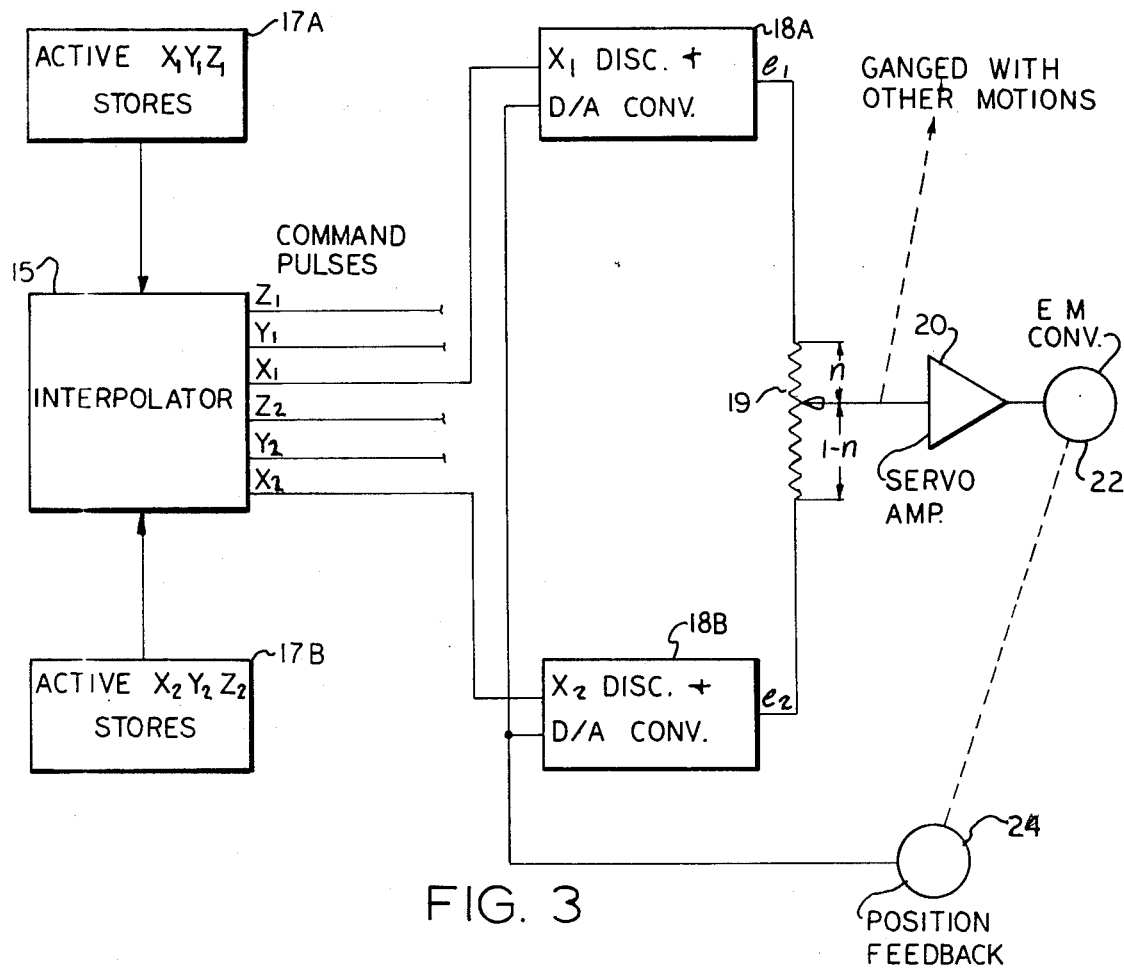
FIG. 3 is a block diagram of the essential functional elements of one embodiment of this invention.

In FIG. 3 is shown the rudiments of one embodiment of this invention. One store 17A contains the $X_1$, $Y_1$, and $Z_1$ information for path $P_1$, and store 17B contains the $X_2$, $Y_2$, and $Z_2$ information for path $P_2$. Simultaneously, corresponding bits of information for $X_1$, and $X_2$ are isolated in the interpolator 15 and are applied respectively, to the discriminators 18A and 18B. This portion of the system can now correctly generate the two paths, $P_1$ and $P_2$. The X voltages are combined with the actual tool position voltage in the position error discriminator 18A and 18B obtained in the feedback 24. Neglecting the following error, the error signals $e_1$ and $e_2$ equal the distance the actual machine position is from the two paths, $P_1$ and $P_2$, FIG. 1. Then $$e_1 + e_2 = \Delta x \quad (1)$$

the output of potentiometer 19 must equal 0, that is, $e_o = 0$ to satisfy the servo system including the positive feedback 24 and the electromechanical converter 22. That is $$e_0 = e_1 - n(e_1 + e_2) = 0$$

or $$e_1(1 - n) = ne_2 \quad (2)$$

substituting (1) in (2):

$$e_1(1 - n) = n(\Delta x - e_1) \text{ and}$$
$$e_1(1 - n + n) = n \Delta x$$
$$e_1 = n\Delta x$$

from equation 1 then $$e_2 = \Delta x - n \Delta x = \Delta x (1 - n)$$

This shows that the error signals are a function only of $n$ and that the machine will follow the desired path of $P_3$ and that the system shown in FIG. 1 will correctly perform the selected program for any diameter of cutting tool between $r_1$ and $r_2$ and even though only two numerical programs have been derived and placed in the computer storage.

Figure 4:
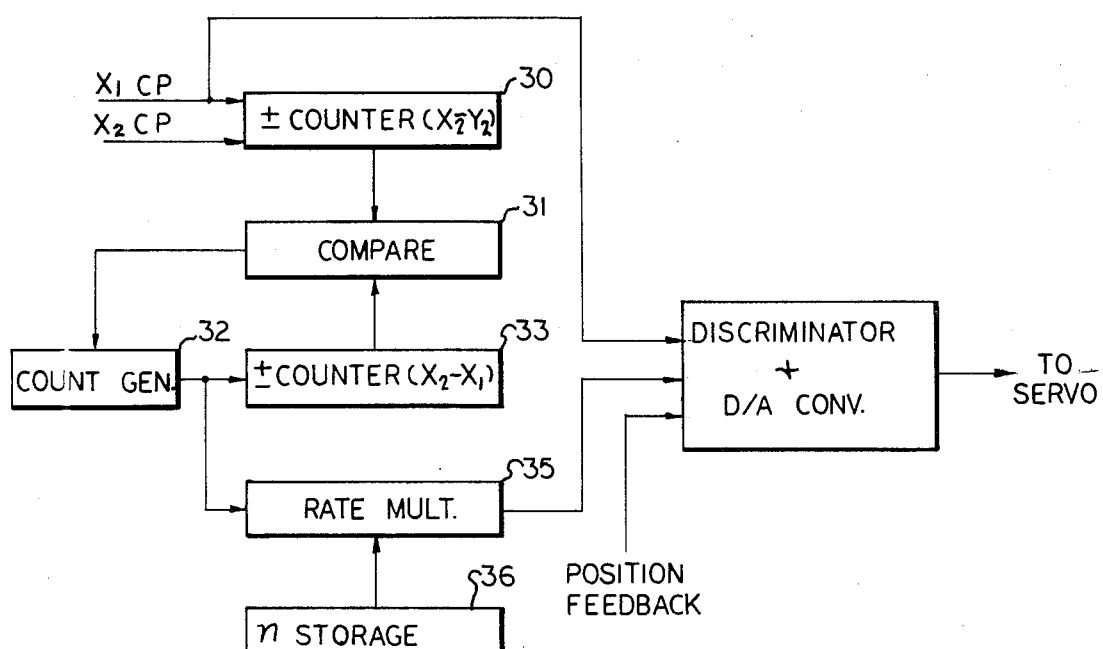
FIG. 4 is a block diagram of the digital components of the preferred embodiment of this invention.

FIG. 4 shows one digital method of producing the path $P_3$. The plus-minus counter which receives the two simultaneous $X_1$ and $X_2$ signals will count up or down as the differences, $\Delta x$, vary. This difference will be a number equal at any time to the path difference $\Delta x$ shown in FIG. 1. The compare circuit 31 algebraically adds the contents of counters 30 and 33 and controls the count generator 32 which produces count pulses to cause plus-minus counter 33 to contain the same number of plus-minus counter 30. The counted pulses in counter 32 represent the number of pulses required to move the machine position from path $P_1$ to $P_2$. Now, the rate multiplier 35 will have as its output n times the number of input pulses which then feed to the discriminator will move the machine the desired distance to produce path $P_3$. In storage device 36 is encoded a digital number n determined by equation (1) and (2) to accommodate any particular cutting tool to be installed on the machine tool.

One advantage of the system of this invention is that it includes an inherent failsafe feature. The two paths are generated and a difference in paths can be easily checked so that if either of the two is exceeded the program cutter radius difference, there has been a control malfunction. Further, the system can also compensate for cutter deflection, which acts like a smaller cutter, by setting the control for a cutter radius larger than the actual cutter by the amount of the deflection.

What is claimed is:

1. The method of compensating for tool wear in a programmed numerically controlled machine tool, said method comprising the steps of generating and storing a first and second set of numbers corresponding, respectively, to the $X$, $Y$ and $Z$ coordinates of separate programmed paths ($P_1$ and $P_2$) of machine tools of two different predetermined dimensions, simultaneously reading out like numerical bits of the two mentioned numerical programs, combining the quantitive values of the read-out numbers to produce a number which is a fixed ratio n of the difference between the numbers corresponding to said two dimensions, and applying the resultant number to said machine tool.

2. In the method defined in claim 1 said step of combining the mentioned read-out numbers consisting of applying voltages corresponding to said numbers to opposite ends of a potentiometer and setting the sliding contact of said potentiometer a distance from one end corresponding to said ratio number n.

3. In the method defined in claim 1 said step of simultaneous read-out comprising sensing the actual position of the cutting tool and generating a voltage corresponding to said actual position feeding back said actual position voltage to discriminators for combining with the read-out of said two programs.

4. In the method defined in claim 1 said first and second sets of numbers comprising coded binary bits, said method further comprising applying both sets of numbers to a plus-minus counter so that the counter contains the difference between said two sets of numbers, multiplying the difference number by a multiplying factor $n$ and applying the resultant number to said machine tool.

5. In combination with a machine tool having a spindle and a replaceable rotary cutting tool, a computer comprising two stores adapted to contain, respectively, numerical information comprised of $X$, $Y$ and $Z$ coordinates for defining the paths of cutting tools for machining a workpiece of predetermined size and shape, means for simultaneously reading out from said stores corresponding portions of the numerical information, and means for combining each read-out portion with feedback actual tool position information to produce error signals $e_1$ and $e_2$, combining said signals in the portions, respectively, of $n$ and $1 - n$ and applying the combined signal to said machine tool.

6. In the combination defined in claim 5, said means for combining comprises a potentiometer, opposite ends of which are, respectively, coupled to the sources of said error voltages $e_1$ and $e_2$ and the adjustable contact of which is coupled to said machine tool.

7. In the combination defined in claim 5, said stores each comprise a register for holding binary coded decimal numbers, said means for combining comprises a plus-minus counter for algebraically adding said numbers, and a binary multiplier coupled between said counter and said machine tool.

* * * * *